United States Patent
Ballif et al.

(10) Patent No.: US 11,528,342 B2
(45) Date of Patent: Dec. 13, 2022

(54) INVOKING A RANDOM LINEAR NETWORK CODING COMMUNICATIONS PROTOCOL

(71) Applicant: APS Technology 1 LLC, Sandy, UT (US)

(72) Inventors: Jeffrey G. Ballif, Highland, UT (US); Chris Anderson, Sandy, UT (US)

(73) Assignee: APS Technology 1 LLC, Sandy, UT (US)

(*) Notice: Subject to any disclaimer, the term of this patent is extended or adjusted under 35 U.S.C. 154(b) by 106 days.

(21) Appl. No.: 16/591,496

(22) Filed: Oct. 2, 2019

(65) Prior Publication Data

US 2021/0105342 A1 Apr. 8, 2021

(51) Int. Cl.
| | | |
|---|---|---|
| H04L 69/00 | (2022.01) | |
| H04L 12/46 | (2006.01) | |
| H04L 69/22 | (2022.01) | |
| H04L 47/193 | (2022.01) | |
| H04L 69/08 | (2022.01) | |
| H04L 1/00 | (2006.01) | |
| H04L 69/164 | (2022.01) | |
| H04L 67/01 | (2022.01) | |

(52) U.S. Cl.
CPC ............ *H04L 69/03* (2013.01); *H04L 1/0076* (2013.01); *H04L 12/4633* (2013.01); *H04L 47/193* (2013.01); *H04L 67/01* (2022.05); *H04L 69/08* (2013.01); *H04L 69/164* (2013.01); *H04L 69/22* (2013.01)

(58) Field of Classification Search
None
See application file for complete search history.

(56) References Cited

U.S. PATENT DOCUMENTS

| | | | | | |
|---|---|---|---|---|---|
| 7,752,330 | B2* | 7/2010 | Olsen | ................... | H04L 69/163 |
| | | | | | 709/232 |
| 8,473,620 | B2* | 6/2013 | Demmer | ................ | H04L 67/14 |
| | | | | | 709/227 |
| 8,571,214 | B2* | 10/2013 | Lima | ................... | H04N 21/2347 |
| | | | | | 380/212 |

(Continued)

OTHER PUBLICATIONS

Ho et al.; "A Random Linear Network Coding Approach to Multicast." IEEE Oct. 2006, Retrieved on Jul. 12, 2020, Retrieved from https://authors.library.caltech.edu/5107/1/HOTieeetit06.pdf.

*Primary Examiner* — Ranodhi Serrao
(74) *Attorney, Agent, or Firm* — Thorpe North & Western LLP

(57) ABSTRACT

A technology is provided for invoking a random linear network coding (RLNC) communications protocol between a client and server in a network. In one example, a synchronize message requesting a network connection to a server can contain an indication that a client supports the RLNC communications protocol to encode and decode data packets using random linear network coding. The server can analyze the synchronize message for the indication that the client supports the RLNC communications protocol and send an acknowledge message to the client indicating that the server supports the RLNC communications protocol. Thereafter, the server can listen on a communications channel for a connection request sent by the client to communicate with the server using the RLNC communications protocol.

16 Claims, 8 Drawing Sheets

(56) References Cited

U.S. PATENT DOCUMENTS

| | | | |
|---|---|---|---|
| 8,611,417 B2* | 12/2013 | Pantelidou | H04L 1/0002 375/240.02 |
| 9,137,492 B2* | 9/2015 | Lima | H04L 63/0428 |
| 9,258,084 B2* | 2/2016 | Zhovnirnovsky | H04L 69/16 |
| 9,979,664 B2* | 5/2018 | Ho | H04L 47/263 |
| 9,992,128 B2* | 6/2018 | Ho | H04L 47/127 |
| 10,135,746 B2* | 11/2018 | Ho | H04L 47/27 |
| 10,516,617 B2* | 12/2019 | Anderson | H04L 12/4633 |
| 2003/0236841 A1* | 12/2003 | Epshteyn | H04L 69/329 709/206 |
| 2005/0021999 A1* | 1/2005 | Touitou | H04L 69/161 726/11 |
| 2005/0132214 A1* | 6/2005 | Naftali | H04L 69/16 726/26 |
| 2011/0243324 A1* | 10/2011 | Lima | H04L 1/1812 380/212 |
| 2012/0054583 A1* | 3/2012 | Park | H03M 13/6306 714/776 |
| 2012/0236763 A1 | 9/2012 | Lucani et al. | |
| 2013/0051386 A1* | 2/2013 | Pantelidou | H04L 47/25 370/390 |
| 2013/0051388 A1* | 2/2013 | Pantelidou | H04L 1/0076 370/390 |
| 2013/0195106 A1* | 8/2013 | Calmon | H04L 69/14 370/389 |
| 2014/0185803 A1* | 7/2014 | Lima | H04N 21/6131 380/212 |
| 2014/0269485 A1* | 9/2014 | Medard | H04W 28/04 370/312 |
| 2015/0095739 A1* | 4/2015 | Zhovnirnovsky | H04L 69/16 714/759 |
| 2015/0100858 A1* | 4/2015 | Zhovnirnovsky | H04L 1/0009 714/776 |
| 2015/0109967 A1 | 4/2015 | Hogan et al. | |
| 2015/0372809 A1 | 12/2015 | Lima et al. | |
| 2016/0134546 A1* | 5/2016 | Anderson | H04L 47/25 370/235 |
| 2016/0191402 A1* | 6/2016 | Anderson | H04L 47/25 370/236 |
| 2017/0012868 A1* | 1/2017 | Ho | H04L 1/1858 |
| 2017/0012885 A1* | 1/2017 | Ho | H04L 49/552 |
| 2017/0012905 A1* | 1/2017 | Ho | H04L 45/74 |
| 2017/0013065 A1* | 1/2017 | Ho | H04L 45/74 |
| 2018/0212764 A1* | 7/2018 | Shi | H04W 12/033 |
| 2018/0254991 A1* | 9/2018 | Ho | H04L 67/28 |
| 2018/0284744 A1 | 10/2018 | Cella et al. | |
| 2018/0331967 A1* | 11/2018 | Ho | H04L 47/16 |
| 2019/0394136 A1* | 12/2019 | Ho | H04L 47/127 |

* cited by examiner

US 11,528,342 B2

INVOKING A RANDOM LINEAR NETWORK CODING COMMUNICATIONS PROTOCOL

BACKGROUND

Communications across computer networks have become a widely available form of communications. The communications can be between many forms of computing devices, including: mobile devices, servers, clients to servers, game consoles, desktop computers, laptops and a myriad of other computing devices. The form of data being sent in these communications usually takes the form of data packets which are transmitted between the computing devices.

Data may be transmitted through the Internet using packets or chunks of information. Packet formatting and the method for delivering packets across the Internet are governed by the protocol known as TCP/IP (transmission control protocol/internet protocol). For a TCP data transmission to be completed, the recipient TCP layer may collect the packets and organize the packets in the order in which the packets were sent. If a packet is lost, the protocol interprets this as a sign that the network is congested—the transmission speed is immediately halved, and from there the packets speed attempts to increase again at a slow rate. This is beneficial in some situations and inefficient in other situations.

DETAILED DESCRIPTION

A technology is provided for invoking a random linear network coding (RLNC) communications protocol between a client and server in a network using data packets and data in a networking protocol. As explained in more detail later, random linear network coding can be used to reduce network congestion by allowing (i) a receiver (e.g., a server or a client) to ignore lost data packets sent by a transmitter (e.g., the server or the client) and acknowledge the receipt of certain data packets, (ii) a receiver to rebuild lost data packets sent by a transmitter, and (iii) a transmitter to avoid retransmitting data packets. In one example, invoking the RLNC communications protocol between a client and a server may include sending a synchronize (SYN) message from the client to the server requesting a network connection with the server, where the synchronize message indicates that the client supports the RLNC communications protocol. As part of receiving the message, the server may analyze the message for an indication (e.g., a protocol flag, type-length-value, etc.) that the client supports the RLNC communications protocol. In the case that the message indicates that the client supports the RLNC communications protocol, the server may send an acknowledge message in a synchronize-acknowledge packet or an acknowledge packet (e.g., in an SYN-ACK or ACK packet) to the client indicating that the server supports the RLNC communications protocol. Thereafter, the server may listen on a communications channel (e.g., UDP (User Datagram Protocol) port) for a connection request and/or encoded data packets from the client to communicate with the server using the RLNC communications protocol. The communication channel may be a dedicated or defined communications channel (e.g., a dedicated UDP port).

Figure 1:
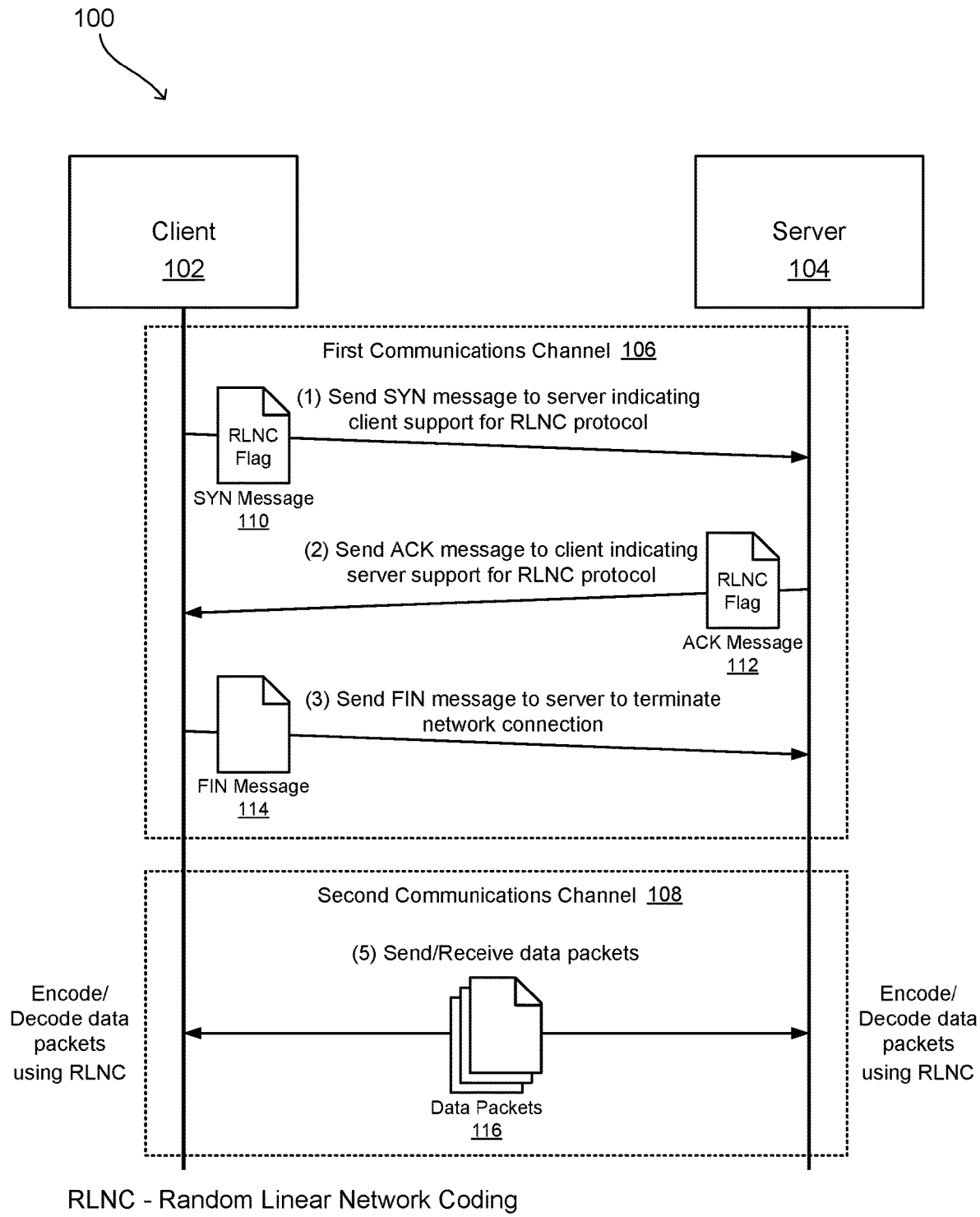
FIG. 1 is a sequence diagram that illustrates various operations associated with invoking a random linear network coding (RLNC) communications protocol between a client and server in a network.

To further describe the present technology, examples are now provided with reference to the figures. FIG. 1 is a sequence diagram illustrating operations used to invoke an RLNC communications protocol between a client 102 and a server 104. The client 102 may be configured to support the RLNC communications protocol by encoding and decoding data packets (e.g., encoding or decoding the contents of data packets and portions of the packet headers as described later) using random linear network coding. Likewise, the server 104 may be configured to support the RLNC communications protocol by decoding and encoding data packets using random linear network coding.

As shown, a client 102 may send a synchronize message 110 to the server 104 using a first communications channel 106 (e.g., a logical connection over a computer network) requesting a network connection with the server 104. The synchronize message 110 may indicate that the client 102 supports the RLNC communications protocol. For example, a header of the synchronize message 110 can include a field containing an RLNC protocol flag, a type-length-value (TLV), a cryptographic hash, or another value or data field that indicates that the client 102 supports the RLNC communications protocol. In one example, the synchronize message 110 can be sent using a TCP/IP transmission protocol over the Internet, wherein the synchronize message 110 requests a TCP/IP connection with the server 104, and the header of the synchronize message 110 includes a field value indicating to the server 104 that the client 102 is configured to encode and decode data packets using random linear network coding.

In response to receiving the synchronize message 110 from the client 102, the server 104 may analyze the synchronize message 110 for an indication that the client 102 supports the RLNC communications protocol. For example, the server 104 may analyze a header of the synchronize message 110 to determine whether a designated field in the header contains a value (e.g., RLNC protocol flag, TLC, cryptographic hash, etc.) representing support of the RLNC communications protocol. In determining that the synchronize message 110 indicates client support for the RLNC communications protocol, the server 104 may send an acknowledge message 112 to the client 102 using the first communications channel 106, where the acknowledge message 112 indicates that the server 104 supports the RLNC communications protocol. For example, a header of the acknowledge message 112 may include a field containing an RLNC protocol flag, a TLV, a cryptographic hash, or another value indicating that the server 104 supports the RLNC communications protocol. In one example, the server 104 may obtain an identifier used for the client 102 (e.g., an internet protocol (IP) address or media access control (MAC) address) to allow identification of data packets sent by the client 102 using the RLNC communications protocol to the server 104 as being associated with the client 102.

When received by the client 102, the acknowledge message 112 may be analyzed for an indication that the server 104 supports the RLNC communications protocol. For example, the client 102 may analyze a header of the acknowledge message 112 to determine whether a designated field in the header contains a value (e.g., RLNC protocol flag, TLC, cryptographic hash, etc.) representing server support of the RLNC communications protocol.

After determining that the server 104 supports the RLNC communications protocol via the indication in the acknowledge message 112, the client 102 may initiate termination of the first communications channel 106 to allow a second communications channel 108 to be opened for transmitting data over TCP/IP using the RLNC communications protocol. In one example, the client 102 may initiate termination of the network connection between the client 102 and the server 104 by sending a finish message 114 to the server 104. In response to receiving the finish message 114, the server 104 may close the network connection between the server 104 and the client 102, thereby closing the first communications channel 106. In examples where the first communications channel 106 is implemented using a TCP/IP protocol, a four-way handshake may be used to close the first communications channel 106, wherein the client 102 and the server 104 independently terminate the network connection by transmitting finish messages to each other and acknowledging the finish messages, and waiting for a timeout to occur before closing the first communications channel 106. In another example, the client 102 may abandon a request to connect to the server 104 using the TCP/IP protocol by not transmitting a finish message after determining that the server 104 supports the RLNC communications protocol and the client 104 can start sending encoded data packets to the server 104 via a second communications channel 108, as explained below.

The client 102 may encode data packets 116 for transmission to the server 104 using random linear network coding and the client 102 may send the encoded data packets 116 to the server 104 using a second communications channel 108 (e.g., a UDP communications channel). For example, after determining that the client 102 supports the RLNC communications protocol, the server 104 may open a network port (e.g., UDP port) for communicating with the client 102 using data packets encoded in the RLNC communications protocol and listen for data packets 116 sent from the client 102. The network port may be a dedicated or defined network port. The client 102 may encode data packets 116 using random linear network coding and send the data packets 116 to the network port. The server 104 may receive the data packets 116 sent from the client 102 over the second communications channel 108, and the server 104 may decode the data packets 116 using random linear network coding. Likewise, the server 104 may encode data packets using random linear network coding and send the data packets 116 to the client 102 via the network port, and the client 102 may decode the data packets 116 using random linear network coding.

In cases where a server 104 does not support the RLNC communications protocol, the server 104 may ignore an indication (e.g., RLNC protocol flag) in a synchronize message 110 that a client 102 supports the RLNC communications protocol, and network communication between the client 102 and the server 104 may proceed using a network protocol used to send the synchronize message 110 to the server 104. As an illustration, a client 102 may initially use a TCP/IP transmission protocol to send a synchronize message 110 indicating client support for the RLNC communications protocol to a server 104. If the server 104 is not configured to support the RLNC communications protocol, the server 104 may ignore the indication of client support for the RLNC communications protocol in the synchronize message 110 and proceed with establishing a network connection using the TCP/IP protocol for communications between the client 102 and the server 104.

Figure 2A:
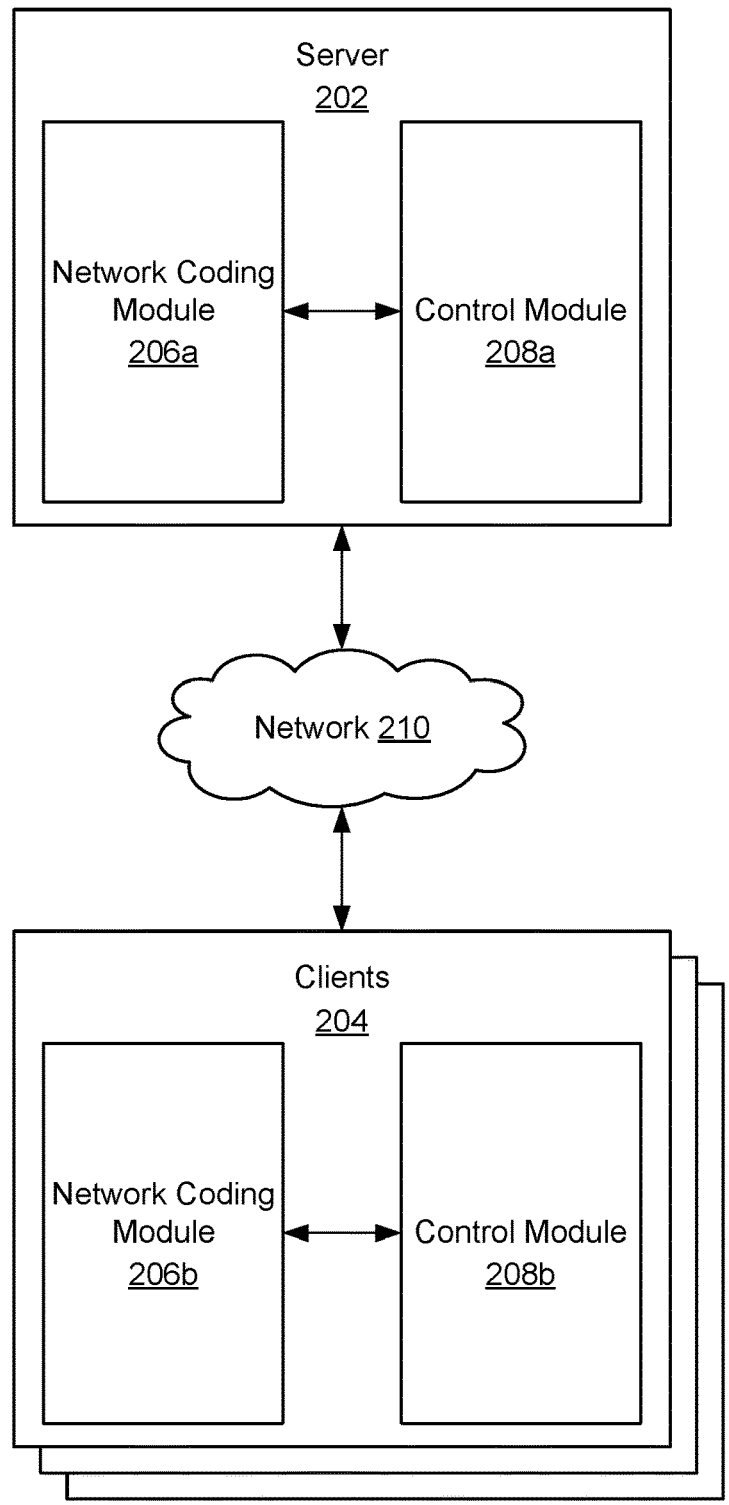
FIG. 2A is a block diagram illustrating an example of a system for communicating over a network using the RLNC communications protocol.
Figure 2B:
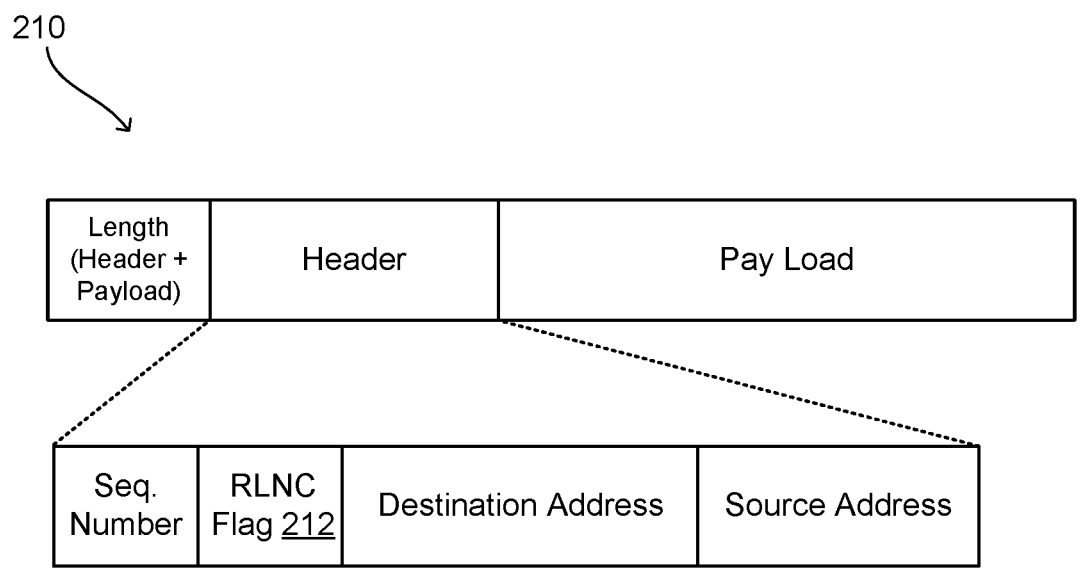
FIG. 2B is a diagram of a data packet that includes an RLNC flag in a header of the data packet.

FIG. 2A is a block diagram illustrating one high level configuration of a system 200 for communicating over a network 210 using the RLNC communications protocol. The system 200 may include a server 202 and a plurality of clients 204 configured to use the RLNC communications protocol to encode and decode data packets using random linear network coding. The server 202 may be any computer accessible by a client 204 over a network 210, including but not limited to a service provider (e.g., "cloud") server, gateway, router, mainframe server, proxy server, etc. The network 210 connecting the server 202 and the client 204 may include a local area network ("LAN"), a wide area network ("WAN"), a wireless network, a cellular network, the Internet, or the like.

A client 204 may be an electronic device or a software application running on a computing device, including a mobile electronic device, a smartphone, a tablet computer, a laptop computer, a desktop computer, a server, a digital media player (e.g., Chromecast, Apple TV, etc.), a network appliance, a gaming console (e.g., PlayStation, Xbox, etc.), or the like. A client 204 implemented as a software application may include a VPN (virtual private network) client and/or an application running on a mobile electronic device.

A server 202 and a client 204 may be capable of encoding data packets using random linear network coding, and sending and receiving the data packets, as well as receiving and decoding data packets encoded using random linear network coding. Random linear network coding enables (i) a receiver (e.g., the server 202 or the client 204) to ignore lost data packets sent by the transmitter (e.g., the server 202 or the client 204) and acknowledge the receipt of certain data packets and (ii) a transmitter to avoid retransmitting data packets, thus reducing network congestion.

A server 202 and a client 204 may contain a network coding module 206a-b configured to encode data packets using random linear network coding, and decode data packets encoded using random linear network coding. Traditional TCP/IP transmission divides data content into sequentially numbered packets and sends each packet with its accompanying sequence number. If a packet (i) does not arrive at its destination and therefore an acknowledgement is not sent to the origin or (ii) an acknowledgement is sent but does not arrive at the origin within a specific window of time, the packet is resent.

In random linear network coding (RLNC), data is divided into data blocks and encoded into coded data packets. Each coded data packet is formed by multiplying each data block with a constant chosen randomly from a finite range of constants and then combining the results. Thus, each coded data packet can be represented by a linear equation in the following form:

$$CDP1 = C_{1,1} \times DB_{1,1} + C_{1,2} \times DB_{1,2} + \ldots + C_{1,m} \times DB_{1,m}$$

$$CDP2 = C_{2,1} \times DB_{2,1} + C_{2,2} \times DB_{2,2} + \ldots + C_{2,m} \times DB_{2,m}$$

$$CDPk = C_{k,1} \times DB_{k,1} \times C_{k,2} \times DB_{k,2} + \ldots + C_{k,m} \times DB_{k,m}$$

Here, CDP represents a "coded data packet," DB represents a "data block," and C represents a randomly chosen constant from a finite range of constants. The randomly chosen constant $C_{k,m}$ multiplied with each data block is encoded in the headers of the coded data packets in which they are used. Assuming there are n data blocks to be sent, coded data packets are sent continuously until n distinct (i.e., linearly independent) coded data packets are received and acknowledged. Once n distinct coded data packets are received, they can be decoded to find the n data blocks. Alternatively, some individual coded data packets can be decoded as they are received. For example, given m distinct coded data packets encoded using a total of p unique data blocks, where m≥p, it is possible to decode the m coded data packets to find the p data blocks.

The server 202 and the client 204 may contain a control module 208a-b. The control module 208a-b may be configured to cause the server 202 and the client 204 to send and receive data packets between each other. The control module 208a-b may use a default network protocol for a network connection, and utilize a RLNC communications protocol when the RLNC communications protocol is supported by both a server 202 and a client 204. In one example, the control module 208a-b may communicate using a TCP layer included in a TCP/IP stack (e.g., a set of TCP/IP network protocol layers) configured to insert an indication of support for the RLNC communications protocol in a header of a packet, and the control module 208a-b may determine whether a header of a received packet contains an indication of support for the RLNC communications protocol.

The control module 208b located on a client 204 may initiate a network connection with a server 202 by causing a synchronize message to be sent from the client 204 to the server 202 using a common network protocol, such as a TCP/IP protocol or another networking protocol. The synchronize message can include an indication that the client 204 supports an RLNC communications protocol by encoding and decoding data packets using random linear network coding. The indication in the synchronize message sent from the client 204 can be an RLNC protocol flag, a type-length-value (TLV), a cryptographic hash, or another value which indicates that the client 204 supports the RLNC communications protocol. As an illustration, FIG. 2A illustrates an example data packet 210 that includes an RLNC flag 212 used to indicate client support of the RLNC communications protocol.

The control module 208b on the client 204 shown in FIG. 2A may analyze an acknowledge message received in response to the client's synchronize message for an indication that the server 202 supports the RLNC communications protocol, and if the acknowledge message indicates server support of the RLNC communications protocol, the control module 208b on the client 204 may initiate closing of the network connection between the client 204 and the server 202, and, in some examples, request opening of a communications channel between the client 204 and the server 202 for sending data to the server 202 using the RLNC communications protocol. The control module 208b may implement the RLNC communications protocol by instructing the network coding module 206b to encode data packets using random linear network coding, and the control module 208b may cause the encoded data packets to be sent to the server 202 using the communications channel. In one example, the communications channel may be a dedicated communications channel, which can include a network connection between the server 202 and the client 204 using a communication endpoint (e.g., network port) dedicated to RLNC communications protocol traffic.

The control module 208a located on the server 202 may analyze a synchronize message received from a client 204 for an indication that the client 204 supports the RLNC communications protocol, and if the client 204 supports the RLNC communications protocol, the control module 208a causes an acknowledge message to be sent to the client 204 indicating that the server 202 also supports the RLNC communications protocol. Thereafter, the control module 208a on the server 202 may listen on a communications channel for data packets sent from the client 204 which are encoded using the RLNC communications protocol. For example, the control module 208a may open a dedicated or defined network port to enable a network connection with the client 204 and to send and receive data packets using the RLNC communications protocol over the network connection. Also, after sending the acknowledge message to the client 204 indicating server support for the RLNC communications protocol, the server 202 may receive a finish message from the client 204 indicating that the client 204 is done sending data using a network protocol (e.g., a TCP/IP transmission protocol) that was used to send the first synchronize message. In response to receiving the finish message, the control module 208a may acknowledge that the finish message was received and that the control module 208a is terminating the network connection between the server 202 and the client 204 by sending a final acknowledge message to the client 204.

As mentioned, the control module 208a on the server 202 may listen on a communications channel for data packets encoded using the RLNC communications protocol. In response to receiving the encoded data packets on the communications channel, the control module 208a instructs the network coding module 206a to decode the data packets using random linear network coding. The control module 208a then causes data obtained from the decoded data packets to be made available to an intended recipient of the data on the client 204, such as an application, process, service, or the like.

Figure 3:
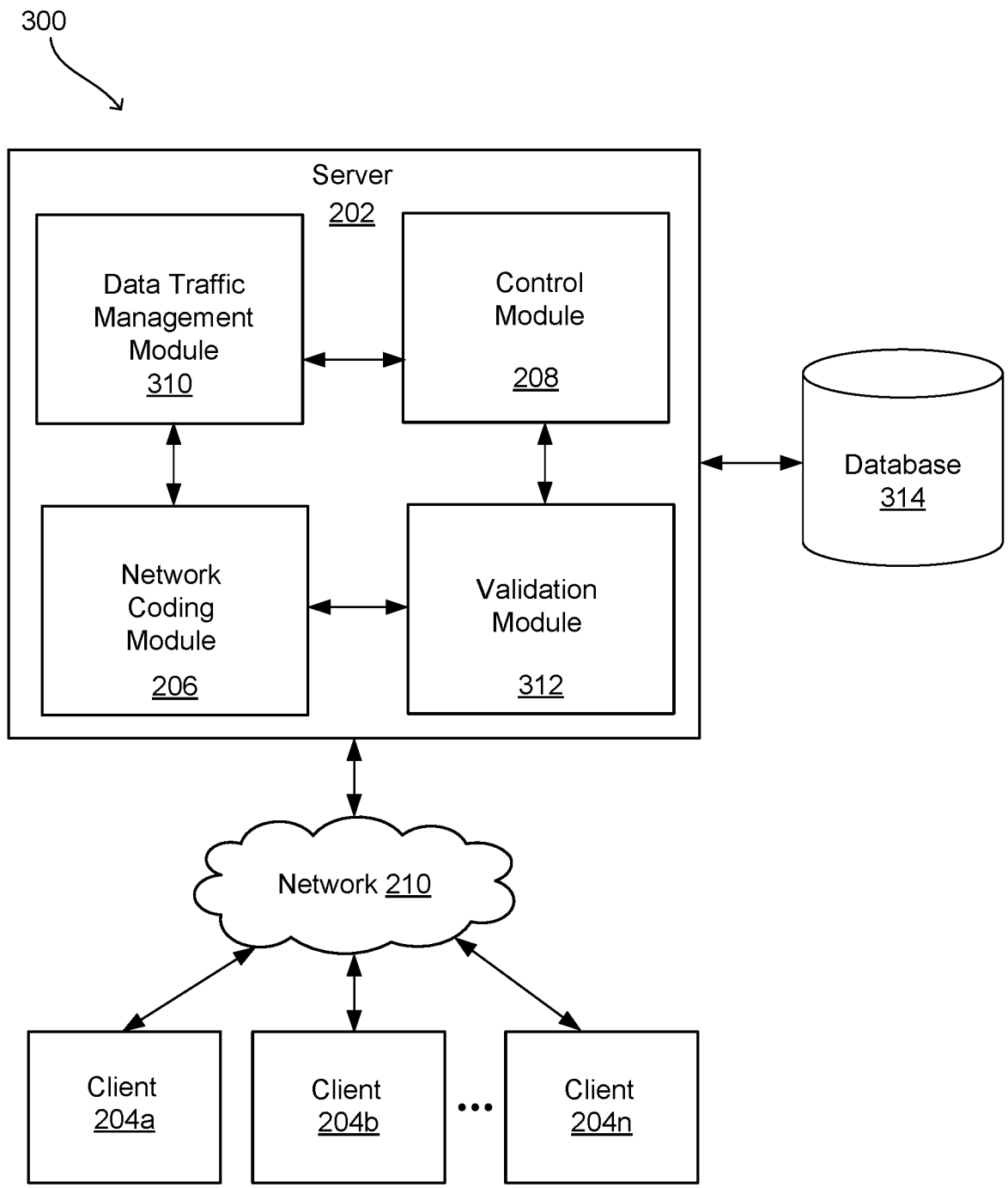
FIG. 3 is block diagram that illustrates another example of a system that includes a server and clients configured to support the RLNC communications protocol.

FIG. 3 is a block diagram illustrating another example of a system 300 that includes a server 202 and clients 204a-n configured to support the RLNC communications protocol. The server 202 may include the network coding module 206 and the control module 208 described earlier, as well as a validation module 312 and a data traffic management module 310. The data traffic management module 310, the control module 208, the network coding module 206, the validation module 312 may each be in communication with each other, and communication may occur over one or more types of communication frameworks or communication networks. The sever 202 may include, for example, mechanical, electrical and signaling circuitry needed to connect the modules 310/208/206/312 to each other for communication and/or sending and/or receiving data.

The validation module 312 may be configured to authenticate a client 204a-n and determine whether the client 204a-n possesses valid authorization to encode and decode data packets using random linear network encoding. In one embodiment, the control module 208 causes the server 202 and a client 204a-n to send to and receive from each other data packets encoded using random linear network (RLNC) coding in response to the validation module 312 authenticating the client 204a-n and determining that the client 204a-n possesses valid authorization. A database 314 can be used to store a unique identifier for each client 204a-n. This identifier can be a unique alphanumeric code, picture, or other authentication token. For example, the stored identifier may be an encrypted hash of a client's MAC address. The database 314 can also store an indicator of whether a client 204a-n is authorized to encode or decode data packets using random linear network coding. In another embodiment, the control module 208 causes the server 202 and the client 204a-n to stop sending and receiving data packets encoded using random linear network coding between each other in response to the validation module 312 determining that the client 204a-n lacks valid authorization or a valid license.

The data traffic management module 310 may be configured to measure characteristics of a data stream and analyze the characteristics of the data stream to determine whether to continue using the RLNC communications protocol to transmit the data stream. Characteristics of the data stream can include, but is not limited to, a data loss rate at one or more time periods and a data throughput rate. In one example configuration, the data traffic management module 310 analyzes and/or determines a data loss rate pertaining to a data stream between the server 202 and a client 204a-n. A data stream includes data packets sent and received between the server 202 and a client 204a-n. In one example, the data traffic management module 310 can simultaneously determine the data loss rate pertaining to multiple data streams between the server 202 and multiple clients 204a-n. The data loss rate pertaining to a data stream may be defined in different ways. In one example, the data loss rate may be the total number of data packets sent by either (i) the server 202, (ii) a client 204a-n, or (iii) both the server 202 and the client 204a-n, but not received by the server 202 and/or the client 204a-n over a set period of time. For example, the data loss rate may be, during a one second interval, the total number of data packets sent by a client 204a-n to the server 202 that were not received by the server 202. In another embodiment, the data loss rate is the total number of data packets resent by (i) the server 202, (ii) the client 204a-n, or (iii) both the server 202 and the client 204a-n over a set period of time. An example of the data loss rate using this definition may be, during a one second interval, the total number of data packets resent by server 202 to the client 204a-n.

A data loss rate above a certain threshold can have an adverse impact on the performance of real-time software applications running on the server 202 and/or a client 204a-n, including but not limited to video teleconferencing, video streaming, and graphic and network heavy online multiplayer games. Thus, measuring the data loss rate between the server 202 and a client 204a-n can be used to identify when network congestion is severely impairing the functionality of these applications. To more accurately measure the average data loss rate between the server 202 and a client 204a-n, it may be advantageous to vary the window of time during which the data traffic management module 310 counts the total number of data packets lost, receives requests to retransmit data packets, or resends data packets. Thus, for example, the data traffic management module 310 may count the total number of data packets lost between the server 202 and a client 204a-n over a five second interval. A longer sampling window may give the data traffic management module 310 a better understanding of the state of congestion within a network between the server 202 and a client 204a-n by better averaging the impact of momentary spikes or dips in network congestion. A shorter sampling window may allow for a quicker reaction to changes in network congestion.

The data traffic management module 310 may determine the data loss rate pertaining to a data stream between the server 202 and a client 204a-n either continuously, at regular intervals (e.g., every 30 seconds), and/or at scheduled times (e.g., during peak network usage hours). Determining the data loss rate pertaining to a data stream continuously allows the data traffic management module 310 to maintain a moving window average of the data loss rate. For example, the data loss rate determined by the data traffic management module 310 may be the average of the most recent three data loss rates measured. In another example, the data loss rate determined by the data traffic management module 310 may be the weighted average of the most recent five data loss rates measured, with the more recently measured data loss rates weighted more heavily.

Encoding data packets using random linear network coding can increase overhead in terms of both packet header size and time spent encoding and decoding packet payloads, as well as an increase in the size of the coded data packet header to include the randomly chosen constants. The overhead incurred is typically small compared to the efficiency gained by the transmitter (e.g., the server 202 or the client 204a-n) not having to retransmit lost coded data packets and the receiver (e.g., the server 202 or the client 204a-n) only having to acknowledge the receipt of every distinct coded data packet. However, in certain scenarios, encoding data packets using random linear network coding will actually increase network congestion and result in lower data throughput rates. Since it is possible that not all coded data packets created by random linear network coding are distinct, the transmitter may have to send more than n coded data packets in order for n distinct coded data packets to be received. Thus, if network congestion is low and there is very little to no packet loss, sending coded data packets encoded using random linear network coding may use more network bandwidth compared to encoding and sending data packets using another network protocol like the traditional TCP/IP transmission protocol.

The present technology allows for determining whether to continue to use the RLNC communications protocol based on characteristics of a data stream being transmitted between the server 202 and a client 204a-n. As one example, the data traffic management module 310 can determine that a data loss rate is lower than a threshold, and in response, the control module 208 causes the server 202 and a client 204a-n to stop sending and receiving data packets encoded using random linear network coding between each other. As another example, the data traffic management module 310 can analyze and/or determine a data throughput rate pertaining to a data stream between the server 202 and a client 204a-n. The data traffic management module 310 can simultaneously determine data throughput rates pertaining to multiple data streams between the server 202 and multiple clients 204a-n. The data traffic management module 310 can determine that a data throughput rate is lower than a threshold, and in response, the control module 208 can instruct the server 202 and a client 204a-n to stop sending and receiving data packets encoded using random linear network coding.

In some examples, the data traffic management module 310 can determine a data loss rate pertaining to a data stream at various times (e.g., 8 a.m. to 5 p.m., day, week, month, Mondays, weekends, New Year's Day) and/or a data throughput rate (e.g., an amount of data transmitted in a given time period) pertaining to a data stream at various times. The data traffic management module 310 can dynamically and/or automatically adjust thresholds and/or set the thresholds used to determine whether to continue to utilize the RLNC communications protocol based on a data loss rate and/or data throughput rate pertaining to a data stream. As an example, the thresholds may be dynamically and/or automatically adjusted and/or set to data loss rates for real-time load balancing of various modules or applications of the server 202 and/or client 204a-n while maintaining the highest data throughput rates between the server 202 and the client 204a-n.

As part of a determination to stop sending and receiving data packets encoded using random linear network coding, the control module 208 may cause a message to be sent to a client 204a-n that instructs the client 204a-n to stop using the RLNC communications protocol, and the control module 208 may cause a data stream to be sent to the client 204a-n using another network protocol, such as a TCP/IP transmission protocol.

Figure 4:
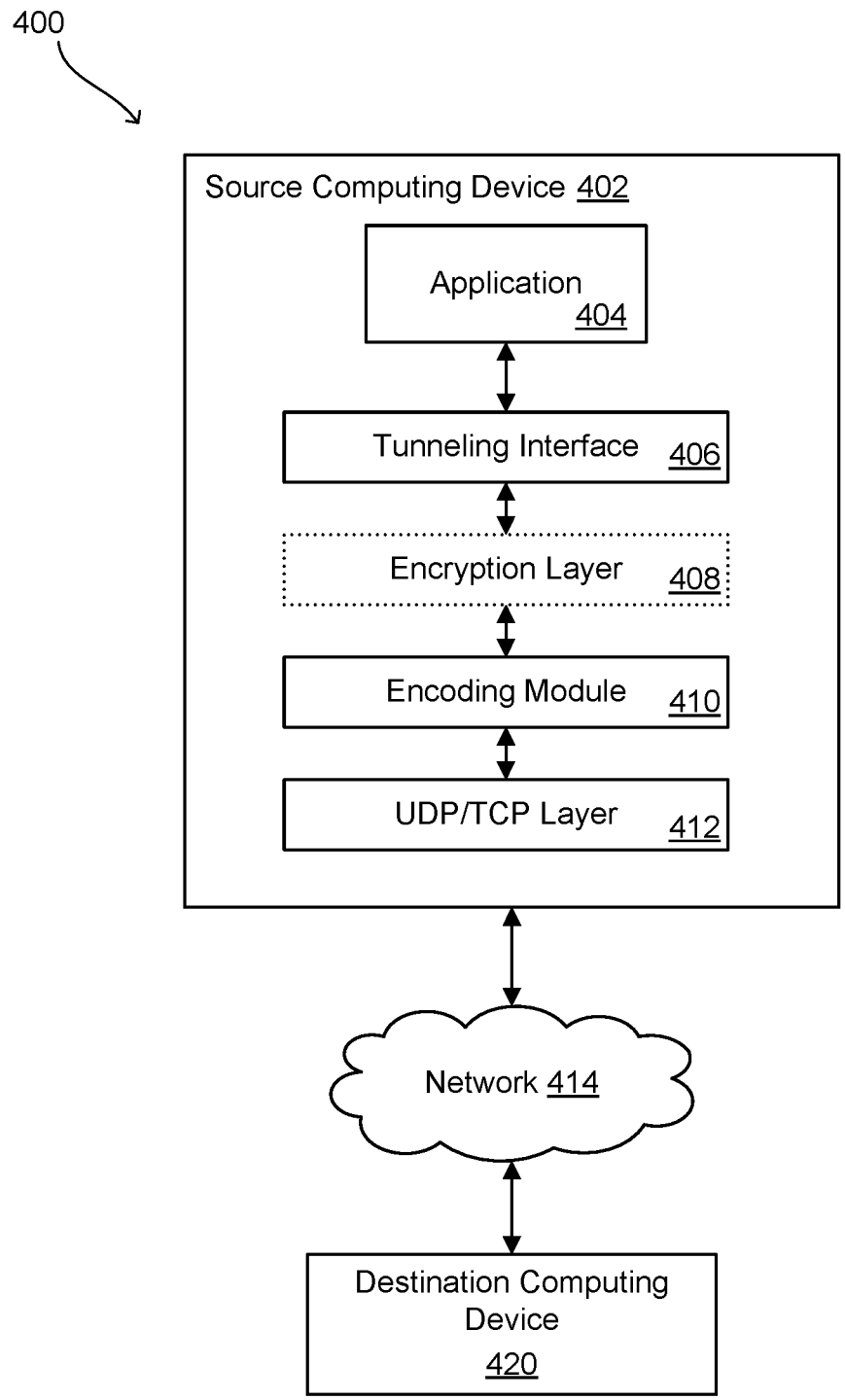
FIG. 4 is a block diagram illustrating an example of the technology using a tunneling interface and a random linear network coding to prepare data packets to be sent across a network.

FIG. 4 illustrates an example system 400 that can include an application 404 on a source computing device 402 that sends data packets using the RLNC communications protocol through a network 414 such as the Internet (e.g., through a hard wired connection or using a wireless connection such as WI-FI) or a cellular network which then communicates through the Internet or another packet switched network. A source computing device 402 (e.g., server) can be configured to analyze a synchronize message received from a destination computing device 420 (e.g., client) for an indication that the destination computing device 420 supports the RLNC communications protocol to encode and decode data packets using random linear network coding. If the synchronize message indicates support of the RLNC communications protocol, the source device 402 sends an acknowledge message to the destination device 420 indicating that the source device 402 supports the RLNC communications protocol. In the scenario where the source computing device 402 and the destination computing device 420 support the RLNC communications protocol, data packets sent between the source computing device 402 and the destination computing device 420 can be encapsulated using a tunneling protocol.

The application 404 can be located in a memory device of a source computing device 402 configured to send data packets over a computer network 414. For example, the application 404 may be a content server executing on a hardware layer that is configured to deliver streaming video, streaming audio, text, web pages, or other content. Alternatively, the application 404 may be a client application requesting content.

A tunneling interface 406 can be configured to receive the data packets from the application 404 and encapsulate the data packets using the tunneling protocol. In one example, the tunneling interface 406 may be a virtual private network (VPN), TAP (network tap) interface, a TUN (network TUNnel) interface, or another type of tunneling interface 406.

The use of a tunneling interface 406 or VPN interface may enable the source computing device 402 to use the RLNC communications protocol with multiple applications accessing the same tunneling interface 406 on a device (e.g., a mobile device, desktop device, laptop, etc.) or in embedded hardware without specifically adding an RLNC layer or processing into each application. Further, each application 404 may setup or access the application's own separate tunneling interface 406 or VPN network interface. This way the traffic for the application 404 can be funneled through the tunneling interface 406 and may be connected with a single receiving device or server through the tunneling interface 406. Alternatively, a group of applications 404 may share a tunneling interface 406 that is destined for one or more destination computing devices 420 within a virtualized network or physical data center.

While a VPN interface is often encrypted, the use of encryption with the tunneling interface 406 may be optional as illustrated by the encryption layer 408 shown with dotted lines. Packets from the tunneling layer can be encoded and decoded using random linear network coding with or without encryption. Therefore, in some configurations, if a user or application designer does not want the extra overhead of encryption but wants packet error correction using random linear network coding, such a configuration is available. The VPN interface may be used because the network traffic from multiple applications can be funneled through the interface.

Once data packets have been encapsulated in the tunneling protocol, an encoding module 410 or encoder may receive the encapsulated packets and encode the data packets from the tunneling interface 406 using random linear network coding to form coded data packets. Encoding the data packets using random linear network coding may make the group of data packets resistant to data packet loss and increase the speed of the data packet transmissions because lost data packets are not re-transmitted but are re-constructed at the destination computing device 420 or receiving software.

A UDP/TCP (user datagram protocol/transmission control protocol) layer 412 can be configured to encapsulate and send the encoded data packets over the Internet using UDP (user datagram protocol). Sending the packets using UDP can increase the speed of transmission of the data packets, but UDP does not guarantee the delivery of the data packets. Random linear network coding may be able to compensate for any packets that are lost by mathematically reconstructing the lost information on the destination computing device 420. The UDP packets can contain encoded TCP packets to transport the packets from the encoder to the destination decoder. If any control packets (e.g., with random linear network coding mathematical coefficients) are necessary to perform lost packet reconstruction, these packets can be sent using the TCP or UDP protocol.

The encoded data packets may be sent across a network 414, and the data packets may be received at a destination computing device 420. Once the data packets are received at the destination computing device 420, the data packets may be decoded using random linear network coding and encapsulation may be removed when the data packets arrive at the destination tunneling protocol layer (e.g., destination virtual network). In one example, this virtual network can be a virtual private network formed between two applications.

The source computing device 402 may transfer any type of data that an application 404 may be configured to send to a destination computing device 420. For example, files, videos, database transactions, web pages, ebooks, audio, voice over internet protocol (VOIP) or other information may be located on the source computing device 402 and data packets can be sent through the tunneling interface 406, encoding module and UDP/TCP layers as described above. Because the data packets passing through the tunneling interface 406 may be encoded using random linear network coding and sent via UDP this can increase the overall speed of the data packets being sent.

The communication layering illustrated on the source computing device 402 may also exist on the destination computing device 420. Data packets received by the destination computing device 420 can be processed through the communications layers in the reverse order that the encapsulation and decoding originally took place in order to obtain the actual data that was sent in the data packets.

Figure 5:
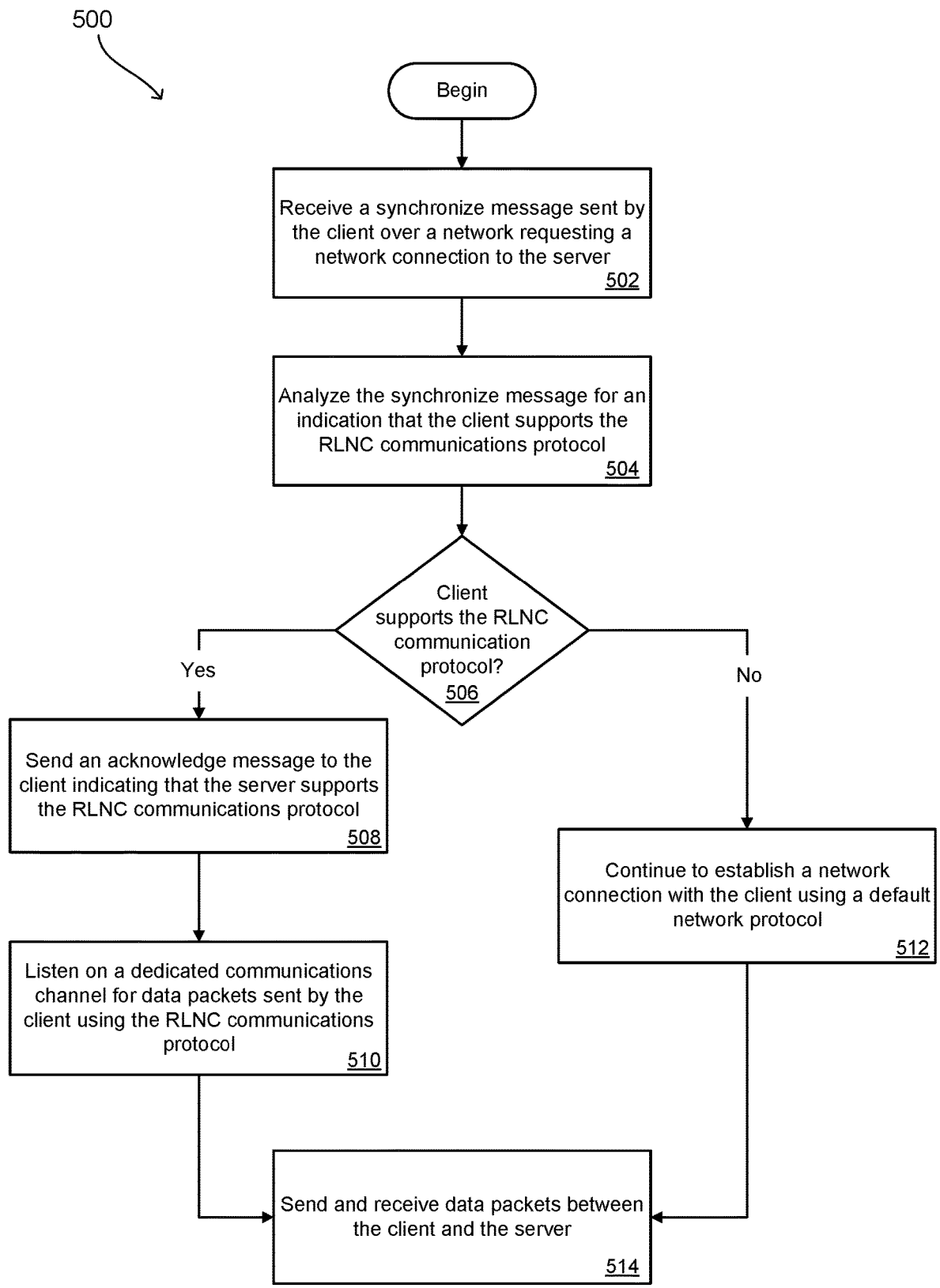
FIG. 5 is a flow diagram that illustrates an example method for invoking an RLNC communications protocol from a server perspective.

FIG. 5 is a flow diagram illustrating a method 500 for invoking a random linear network coding (RLNC) communications protocol between a client and server in a network. As explained earlier, random linear network coding can be used to reduce network congestion by allowing (i) a receiver (e.g., a server or a client) to ignore lost data packets sent by a transmitter (e.g., the server or the client) and acknowledge the receipt of certain data packets, and (ii) a transmitter to avoid retransmitting data packets. The method 500 can be used to determine whether a client and a server support an RLNC communications protocol by encoding and decoding data packets using random linear network coding, and utilize the RLNC communications protocol when supported by both the client and the server.

As in block 502, a server may receive a synchronize message sent by a client over a network requesting a network connection to the server. The synchronize message can contain an indication that the client supports the RLNC communications protocol. The indication can be included in the header of the synchronize message. For example, the indication can be a RLNC protocol flag, a type-length-value (TLV), a cryptographic hash, or any other type of value or packet field used to indicate client support of the RLNC communications protocol. In one example, a transmission control protocol (TCP) layer installed on the client sets an indication (e.g., an RLNC protocol flag, TLV, cryptographic hash, etc.) in a header of the synchronize message to indicate that the client supports the RLNC communications protocol.

As in block 504, the server analyzes the synchronize message for an indication that the client supports the RLNC communications protocol. In one example, a TCP layer installed on the server can be used by a processor of the server to analyze the synchronize message for the indication (e.g., an RLNC protocol flag, TLV, cryptographic hash, etc.) that the client supports the RLNC communications protocol. For example, the header of the synchronize message can be parsed to determine whether a field in the header contains a value indicating client support of the RLNC communications protocol. In one example, as described earlier in relation to FIG. 3, the server may determine whether the client possesses valid authorization to use the RLNC communications protocol to send and receive data packets.

As in block 506, in the case that the synchronize message received from the client contains an indication that the client supports the RLNC communications protocol, then as in block 508, the server sends an acknowledge message to the client indicating that the server supports the RLNC communications protocol. For example, a TCP layer installed on the server may set a field value (e.g., an RLNC protocol flag, TLV, cryptographic hash, etc.) in the header of the acknowledge message to indicate server support for the RLNC communications protocol, and the acknowledge message may be sent to the client.

After sending the acknowledge message to the client, the server, as in block 510, may listen on a communications channel for data packets sent by the client using the RLNC communications protocol. The communications channel may be a dedicated communications channel, a set channel, or a defined channel. In one example, the client may send a connection request to communicate with the server using the communications channel, and after acknowledging the connection request, the client and server may send data over the communications channel using the RLNC communications protocol.

In some examples, the server may receive a finished message sent by the client, where the finished message may be sent in response to the client receiving the acknowledge message indicating that the server supports the RLNC communications protocol. In response to receiving the finished message, the server may terminate the network connection with the client and open a dedicated network port to allow the client to send and receive data packets over the dedicated communications channel using the RLNC communications protocol.

In the case that the client does not support the RLNC communications protocol, the server, as in block 512, may continue to establish a network connection with the client using a default network protocol, such as a TCP/IP transmission protocol. For example, the server may send an acknowledge message to the client indicating that the client's synchronize message was received, and as in block 514, the client and the server can send and receive data packets using the default network protocol.

Figure 6:
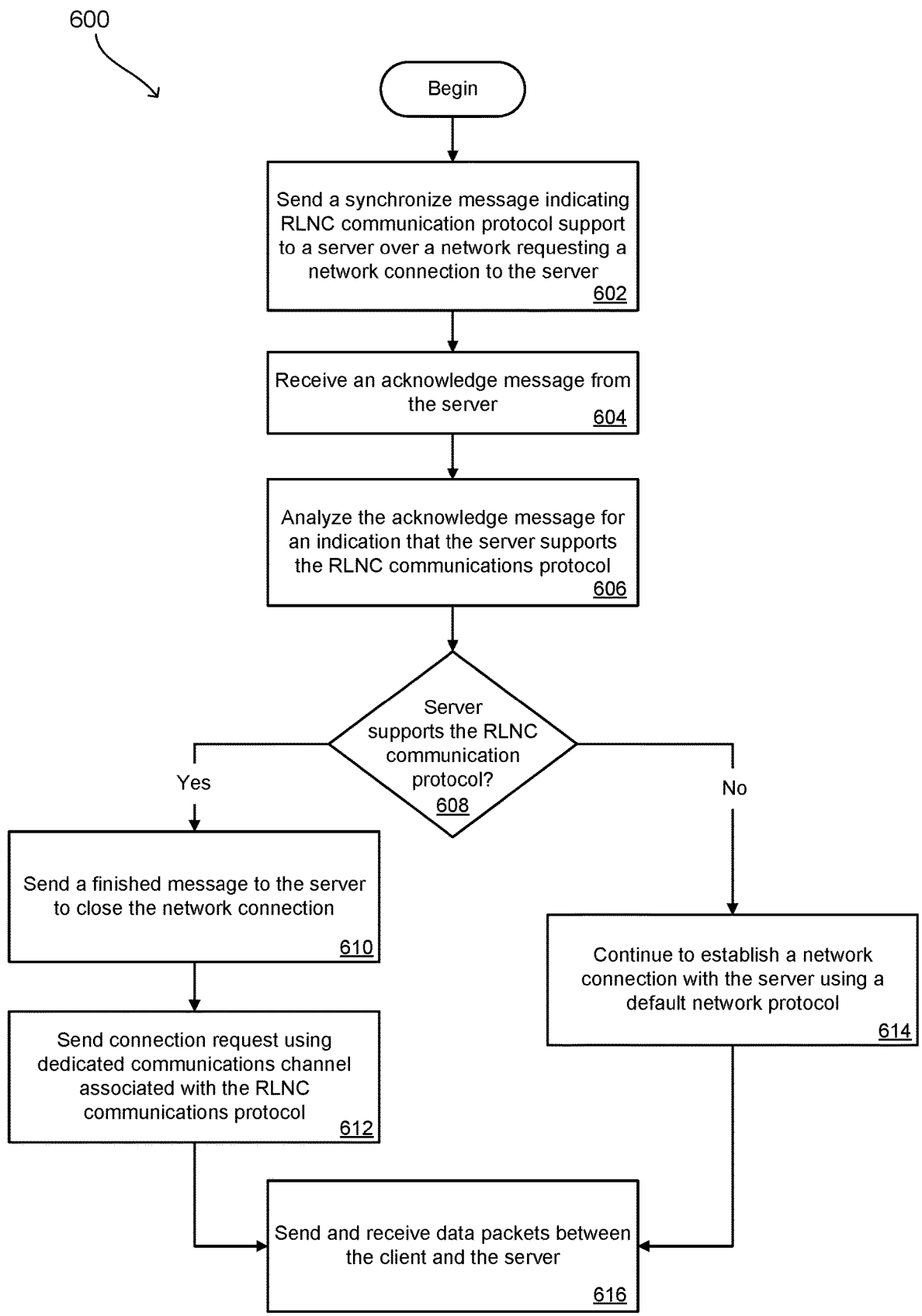
FIG. 6 is a flow diagram illustrating another example method for invoking an RLNC communications protocol from a client perspective.

FIG. 6 is a flow diagram illustrating another example method 600 for invoking a random linear network coding (RLNC) communications protocol between a client and server in a network. The method can include, as in block 602, a client sending a synchronize message to a server requesting a network connection with the server, wherein the synchronize message contains an indication that the client supports the RLNC communications protocol.

In response to the synchronize message sent to the server, the client receives an acknowledge message from the server, as in block 604, and the client may analyze the message for an indication that the server supports the RLNC communications protocol, as in block 606. As in block 608, in the case that the acknowledge message indicates that the server supports the RLNC communications protocol, then as in block 610, the client may send a finished message to the server to close the network connection between the client and the server. For example, where a TCP/IP transmission protocol was used to open a TCP/IP network connection with the server, the client can send a finished message to the server to close the TCP/IP network connection to the server.

After sending the finished message to the server, the client, as in block 612, may send a connection request to the server using a dedicated or defined communications channel associated with the RLNC communications protocol. In one example, a handshake process can be used to create a connection between the client and the server. As a non-limiting example, a three-way handshake comprising a synchronize message, synchronize-acknowledge message, and an acknowledge message can be used to create a network connection between a client and server over a dedicated communications channel. Thereafter, as in block 616, data packets can be sent and received between the client and the server using the RLNC communications protocol and the dedicated communications channel.

In the case that the server does not support the RLNC communications protocol, the server may ignore the indication in the synchronize message that the client supports the RLNC communications protocol. Accordingly, in response to the synchronize message, the server sends an acknowledge message to the client that does not contain an indication of server support for the RLNC communications protocol. Thus, returning to block 606, the client may analyze the acknowledge message received from the server and determine in block 608 that the server does not support the RLNC communications protocol. As in block 614, the client may continue to establish a network connection with the server using a default network protocol, such as a TCP/IP transmission protocol, and as in block 616, the client and the server can send and receive data packets using the default network protocol.

Figure 7:
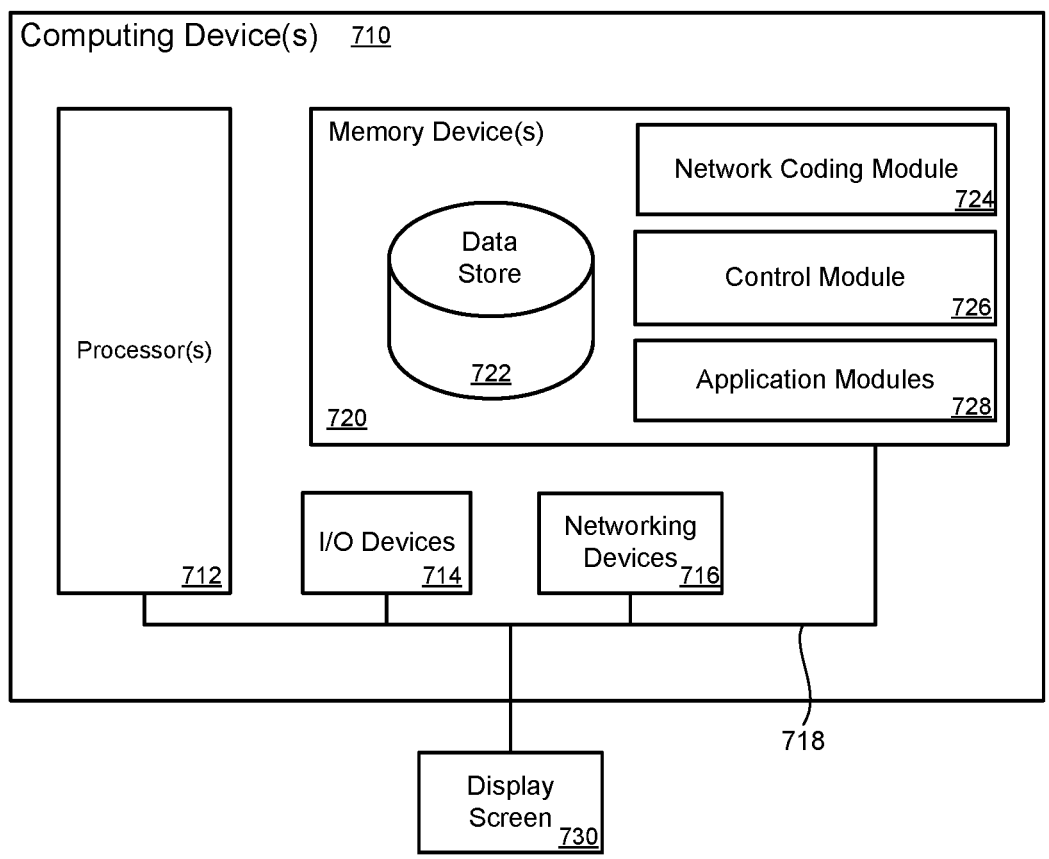
FIG. 7 is block diagram illustrating an example of a computing device that may be used to execute a method that invokes the RLNC communications protocol between a client and server.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device 710. For example, the local communication interface may be a local data bus and/or any related address or control busses as may be desired.

The memory device 720 may contain modules that are executable by the processor(s) 712 and data for the modules. Located in the memory device 720 are modules executable by the processor. For example, a network coding module 724, a control module 726, one or more application modules 728, and other modules may be located in the memory device 720. The modules may execute the functions described earlier. A data store 722 may also be located in the memory device 720 for storing data related to the modules and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing device 710. An example of an I/O device is a display screen 730 available to display output from the computing device 710. Other known I/O device may be used with the computing device 710 as desired. Networking devices 716 and similar communication devices may be included in the computing device 710. The networking devices 716 may be wired or wireless networking devices that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system for invoking a random linear network coding (RLNC) communications protocol between a client and server in a network, comprising:
   at least one processor;
   a memory device including instructions that, when executed by the at least one processor, cause the system to:
   receive on a first communications channel a synchronize message sent by the client over the network requesting a network connection to the server;
   analyze the synchronize message to determine whether the synchronize message contains an indication that the client supports the RLNC communications protocol to encode and decode data packets using random linear network coding, wherein the server analyzes the synchronize message for an RLNC protocol flag that indicates that the client supports the RLNC communications protocol, and sets the RLNC protocol flag in the acknowledge message to indicate that the server supports the RLNC communications protocol;
   send an acknowledge message to the client indicating that the server supports the RLNC communications protocol; and
   listen on a second communications channel for data packets sent by the client to the server using the RLNC communications protocol.

2. The system in claim 1, wherein the synchronize message is analyzed to identify an RLNC protocol flag which indicates that the client supports the RLNC communications protocol.

3. The system in claim 1, wherein the synchronize message is analyzed to identify a type-length-value (TLV) included in the synchronize message that has a value indicating that the client supports the RLNC communications protocol.

4. The system in claim 1, wherein the client sets an RLNC protocol flag in a header of the synchronize message to indicate that the client supports the RLNC communications protocol.

5. The system in claim 1, wherein the memory device further includes instructions that, when executed by the at least one processor, cause the system to determine whether the client possesses valid authorization to use the RLNC communications protocol to send and receive data packets.

6. The system in claim 1, wherein the memory device further includes instructions that, when executed by the at least one processor, cause the system to:
   receive a finished message sent by the client, where the finished message is sent in response to the client receiving the acknowledge message indicating that the server supports the RLNC communications protocol; and
   terminate the network connection with the client.

7. The system in claim 1, wherein the data packets sent between the client and the server are encapsulated using a tunneling protocol.

8. A non-transitory machine readable storage medium including instructions embodied thereon, wherein the instructions, when executed by at least one processor:
   send, by a client, a synchronize message to a server over a first communications channel requesting to connect to the server over a network, wherein the synchronize message contains an indication that the client supports a random linear network coding (RLNC) communications protocol to encode and decode data packets using random linear network coding;
   receive an acknowledge message from the server containing an indication that the server supports the RLNC communications protocol, wherein the server analyzes the synchronize message for an RLNC protocol flag that indicates that the client supports the RLNC communications protocol, and sets the RLNC protocol flag in the acknowledge message to indicate that the server supports the RLNC communications protocol; and
   send data packets over a second communications channel to the server using the RLNC communications protocol.

9. The non-transitory machine readable storage medium in claim 8, wherein the synchronize message and the acknowledge message contain an RLNC protocol flag which indicates support of the RLNC communications protocol.

10. The non-transitory machine readable storage medium in claim 9, wherein the client sets an RLNC protocol flag in a header of the synchronize message to indicate that the client supports the RLNC communications protocol.

11. The non-transitory machine readable storage medium in claim 8, wherein the data packets are sent to the server using a user datagram protocol (UDP) communications channel dedicated for transmitting data packets using the RLNC communications protocol.

12. A computer implemented method, comprising:
receiving on a first communications channel a synchronize message sent by a client over a network requesting a network connection to a server;
analyzing the synchronize message to determine whether the synchronize message contains an indication that the client supports a random linear network coding (RLNC) communications protocol to encode and decode data packets using random linear network coding, wherein the server analyzes the synchronize message for an RLNC protocol flag that indicates that the client supports the RLNC communications protocol, and sets the RLNC protocol flag in the acknowledge message to indicate that the server supports the RLNC communications protocol;
sending an acknowledge message to the client indicating that the server supports the RLNC communications protocol; and
listening on a second communications channel for data packets sent by the client to the server using the RLNC communications protocol.

13. The method in claim 12, wherein the synchronize message is analyzed to identify a type-length-value (TLV) included in the synchronize message that has a value indicating that the client supports the RLNC communications protocol.

14. The method in claim 12, wherein the client sets an RLNC protocol flag in a header of the synchronize message to indicate that the client supports the RLNC communications protocol.

15. The method in claim 12, further comprising determining whether the client possesses valid authorization to use the RLNC communications protocol to send and receive data packets.

16. The method in claim 12, further comprising:
receiving a finished message sent by the client, where the finished message is sent in response to the client receiving the acknowledge message indicating that the server supports the RLNC communications protocol; and
terminating the network connection with the client.

* * * * *